US012646189B2

(12) United States Patent
Uss et al.

(10) Patent No.: US 12,646,189 B2
(45) Date of Patent: Jun. 2, 2026

(54) METHOD AND DEVICE FOR GENERATING DEPTH MAP

(71) Applicant: SAMSUNG ELECTRONICS CO., LTD., Suwon-si (KR)

(72) Inventors: Mykhailo Uss, Kyiv (UA); Ruslan Iermolenko, Kyiv (UA); Olena Kolodiazhna, Kyiv (UA); Volodymyr Savin, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/235,211

(22) Filed: Aug. 17, 2023

(65) Prior Publication Data

US 2024/0144503 A1 May 2, 2024

Related U.S. Application Data

(63) Continuation of application No. PCT/KR2023/010103, filed on Jul. 14, 2023.

(30) Foreign Application Priority Data

Oct. 31, 2022 (KR) ........................ 10-2022-0142637

(51) Int. Cl.
*G06T 7/514* (2017.01)
*G06T 17/00* (2006.01)

(52) U.S. Cl.
CPC .............. *G06T 7/514* (2017.01); *G06T 17/00* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS 9,460,513 B1 10/2016 Ramalingam et al.
10,460,460 B2 10/2019 Wu et al.
(Continued)

FOREIGN PATENT DOCUMENTS

CN 110060335 A 7/2019
CN 110689514 A 1/2020
(Continued)

OTHER PUBLICATIONS

Sajjan et al., "ClearGrasp: 3D Shape Estimation of Transparent Objects for Manipulation," arXiv:1910.02550v2 [cs.CV], Oct. 2019, Total 13 pages.
(Continued)

*Primary Examiner* — Frank S Chen
(74) *Attorney, Agent, or Firm* — Sughrue Mion, PLLC

(57) ABSTRACT

A method for generating a depth map includes acquiring at least one image of a scene including a reflective object or a semi-transparent object, acquiring, from the at least one image, a first depth map including a depth value for at least one opaque object which is reflected by the reflective object or viewed through the semi-transparent object, acquiring, from the at least one image, a second depth map including a depth value for the reflective object or the semi-transparent object, and generating a depth map for the scene based on the acquired first depth map and the acquired second depth map, and the generated depth map includes the depth value for the reflective object or the semi-transparent object and the depth value for the at least one opaque object which is reflected by the reflective object or viewed through the semi-transparent object.

20 Claims, 16 Drawing Sheets

(56) References Cited

U.S. PATENT DOCUMENTS

| | | | |
|---|---|---|---|
| 10,466,714 B2 | 11/2019 | Taimouri et al. | |
| 10,546,429 B2 | 1/2020 | Rhodes, Jr. et al. | |
| 2015/0241564 A1 | 8/2015 | Takano | |
| 2017/0285345 A1 | 10/2017 | Ferens et al. | |
| 2018/0357516 A1 | 12/2018 | Protter et al. | |
| 2020/0193623 A1* | 6/2020 | Liu | G06N 3/04 |
| 2020/0309926 A1 | 10/2020 | Thayer et al. | |
| 2022/0019852 A1* | 1/2022 | Eyjolfsdottir | G06T 17/205 |
| 2022/0092802 A1 | 3/2022 | Jang et al. | |
| 2022/0292699 A1* | 9/2022 | Zhu | G06T 7/90 |
| 2022/0381913 A1 | 12/2022 | Joba et al. | |

FOREIGN PATENT DOCUMENTS

| | | |
|---|---|---|
| CN | 114049399 A | 2/2022 |
| JP | 6241793 B2 | 12/2017 |
| JP | 2021-56142 A | 4/2021 |
| KR | 10-2016-0034513 A | 3/2016 |
| KR | 10-2019-0039663 A | 4/2019 |
| WO | 2021/215236 A1 | 10/2021 |

OTHER PUBLICATIONS

Tan et al., "Mirror3D: Depth Refinement for Mirror Surfaces," arXiv:2106.06629v1 [cs.CV], Jun. 2021, Total 23 pages.

International Search Report (PCT/ISA/210) issued on Oct. 18, 2023 by the International Searching Authority in International Patent Application No. PCT/KR2023/010103.

Written Opinion (PCT/ISA/237) issued on Oct. 18, 2023 by the International Searching Authority in International Patent Application No. PCT/KR2023/010103.

Extended European Search Report issued Sep. 16, 2025 by the European Patent Office for EP Patent Application No. 23885945.8.

Tsin Yanghai et al.; "Stereo Matching with Reflections and Translucency," Jun. 18, 2003, XP 93308199 A.

* cited by examiner 610
630 620

720

710

800

800

800

900

900

900

1100

METHOD AND DEVICE FOR GENERATING DEPTH MAP

CROSS-REFERENCE TO RELATED APPLICATION

This application is a bypass continuation application of International Application No. PCT/KR2023/010103, filed on Jul. 14, 2023, which is based on and claims the benefit of a Korean Patent Application No. 10-2022-0142637, filed on Oct. 31, 2022, in the Korean Intellectual Property Office, the disclosure of each of which is incorporated by reference herein in its entirety.

BACKGROUND

Field

The disclosure relates to a method and a device for generating a depth map. Specifically, the disclosure relates to generating a depth map when a reflective object or a semi-transparent object exists in a scene.

Description of the Related Art

Three-dimensional (3D) environment reconstruction is widely used in fields such as augmented reality (AR), virtual reality (VR), robotics, autonomous driving, and the Metaverse.

Depth perception is an essential technology enabling 3D environment reconstruction. An existing depth perception method may not work properly when there is a reflective object (or a reflective surface) or a semi-transparent object in a scene.

FIG. 12A and FIG. 12B show depth perception and a reconstructed 3D environment when a semi-transparent object exists in a scene, according to a related art. If a semi-transparent object 1200 exists in a scene, the semi-transparent object 1200 may not be perceived as illustrated in FIG. 12A, and thus no semi-transparent object may exist in the reconstructed 3D environment. Otherwise, as illustrated in FIG. 12B, objects behind the semi-transparent object may not be perceived. Accordingly, objects behind the semi-transparent object 1200 may not exist in the reconstructed 3D environment.

FIG. 13 shows depth perception and a reconstructed 3D environment when a reflective object exists in a scene, according to a prior art. If a reflective object 1300 exists in a scene, it may be perceived, as illustrated in FIG. 13, that objects reflected and displayed by the reflective object 1300 exist behind the reflective object. Accordingly, in the reconstructed 3D environment, objects located in front of the reflective object 1300 may also be improperly located behind the reflective object 1300.

In a related art, when a semi-transparent object or a reflective object exists in a scene, the semi-transparent object or the object reflected by the reflective object may not be properly perceived in the reconstructed 3D environment.

SUMMARY

According to an embodiment of the disclosure, a method for generating a depth map includes acquiring at least one image of a scene including a reflective object or a semi-transparent object, acquiring, from the at least one image, a first depth map including a depth value for at least one opaque object which is reflected by the reflective object or viewed through the semi-transparent object, acquiring, from the at least one image, a second depth map including a depth value for the reflective object or the semi-transparent object, and generating a depth map for the scene based on the acquired first depth map and the acquired second depth map, and the generated depth map includes the depth value for the reflective object or the semi-transparent object and the depth value for the at least one opaque object which is reflected by the reflective object or viewed through the semi-transparent object.

The acquiring of the second depth map may include, based on the scene including the reflective object and the reflective object being placed perpendicularly on an opaque surface, identifying an intersection line between the opaque surface and a surface of the reflective object, determining a depth value of the intersection line, and determining the depth value of the intersection line to be a depth value for the surface of the reflective object.

The acquiring of the second depth map may include, based on the scene including the reflective object and the reflective object being placed in parallel on an opaque surface, determining a depth value of the opaque surface, and determining the depth value of the opaque surface to be the depth value for a surface of the reflective object.

The acquiring of the first depth map may include generating a third depth map including no depth value for the at least one opaque object which is reflected by the reflective object or viewed through the semi-transparent object, estimating the depth value for the at least one opaque object which is reflected by the reflective object or viewed through the semi-transparent object, and synthesizing the estimated depth value for the at least one opaque object with the third depth map.

The acquiring of the first depth map may include predicting a depth map for the at least one opaque object from a sequence of RGB frames for the scene, predicting the depth value for the at least one opaque object based on the reflective object and the at least one opaque object; and synthesizing the predicted depth value for the at least one opaque object with the predicted depth map.

The acquiring of the second depth map may include generating a fourth depth map including no depth value for the reflective object or the semi-transparent object, estimating the depth value for the reflective object or the semi-transparent object, and synthesizing the estimated depth value for the reflective object or the semi-transparent object with the fourth depth map.

The method may further include reconstructing a three-dimensional (3D) environment for the scene based on the generated depth map.

The at least one image may include an RGB-D image.

According to an embodiment of the disclosure, an electronic device for generating a depth map includes a memory configured to store instructions, and a controller coupled to the memory and configured to execute the instructions to: acquire at least one image of a scene including a reflective object or a semi-transparent object, acquire, from the at least one image, a first depth map including a depth value for at least one opaque object which is reflected by the reflective object or viewed through the semi-transparent object, acquire, from the at least one image, a second depth map including a depth value for the reflective object or the semi-transparent object, and generate a depth map for the scene based on the acquired first depth map and the acquired second depth map, and the generated depth map includes the depth value for the reflective object or the semi-transparent object and the depth value for the at least one opaque object which is reflected by the reflective object or viewed through the semi-transparent object.

The controller may be further configured to execute the instructions to, based on the scene including the reflective object and the reflective object being placed perpendicularly on an opaque surface, identify an intersection line between the opaque surface and a surface of the reflective object, determine a depth value of the intersection line, and determine the depth value of the intersection line to be a depth value for the surface of the reflective object.

The controller may be further configured to execute the instructions to, based on the scene including the reflective object and the reflective object being placed in parallel on an opaque surface, determine a depth value of the opaque surface, and determine the depth value of the opaque surface to be the depth value for a surface of the reflective object.

The controller may be further configured to execute the instructions to, generate a third depth map including no depth value for the at least one opaque object which is reflected by the reflective object or viewed through the semi-transparent object, estimate the depth value for the at least one opaque object which is reflected by the reflective object or viewed through the semi-transparent object, and synthesize the estimated depth value for the at least one opaque object with the third depth map.

The controller may be further configured to execute the instructions to, predict a depth map for the at least one opaque object from a sequence of RGB frames for the scene, predict the depth value for the at least one opaque object based on the reflective object and the at least one opaque object, and synthesize the predicted depth value for the at least one opaque object with the predicted depth map.

The controller may be further configured to execute the instructions to, generate a fourth depth map including no depth value for the reflective object or the semi-transparent object, estimate the depth value for the reflective object or the semi-transparent object, and synthesize the estimated depth value for the reflective object or the semi-transparent object with the fourth depth map.

The controller may be further configured to execute the instructions to reconstruct a three-dimensional (3D) environment for the scene based on the generated depth map.

The at least one image may include an RGB-D image.

According to an embodiment of the disclosure, a non-transitory computer-readable storage medium for storing instructions for generating a depth map, and the instructions, when executed by a controller of an electronic device, cause the electronic device to operate a method for generating a depth map, the method includes acquiring at least one image of a scene including a reflective object or a semi-transparent object, acquiring, from the at least one image, a first depth map including a depth value for at least one opaque object which is reflected by the reflective object or viewed through the semi-transparent object, acquiring, from the at least one image, a second depth map including a depth value for the reflective object or the semi-transparent object, and generating a depth map for the scene based on the acquired first depth map and the acquired second depth map, and the generated depth map includes the depth value for the reflective object or the semi-transparent object and the depth value for the at least one opaque object which is reflected by the reflective object or viewed through the semi-transparent object.

FIG. 2 illustrates a flowchart of a method for generating a depth map according to an embodiment of the disclosure;

FIG. 3 illustrates a process for reconstructing a scene according to an embodiment of the disclosure;

FIG. 4 illustrates a method for depth perception when a reflective surface exists, according to an embodiment of the disclosure;

FIG. 5 illustrates a method for depth perception when a semi-transparent surface exists, according to an embodiment of the disclosure;

FIG. 6 illustrates a method for depth perception for a reflective surface according to an embodiment of the disclosure;

FIG. 7 illustrates a method for depth perception for a reflective surface according to an embodiment of the disclosure;

FIG. 8A, FIG. 8B, and FIG. 8C illustrate examples of depth maps when a semi-transparent object exists in a scene;

FIG. 9A, FIG. 9B, and FIG. 9C illustrate examples of depth maps when a reflective object exists in a scene;

FIG. 10 illustrates an example of depth perception and a reconstructed 3D environment when a semi-transparent object exists in a scene, according to an embodiment of the disclosure;

FIG. 11 illustrates an example of depth perception and a reconstructed 3D environment when a reflective object exists in a scene, according to an embodiment of the disclosure;

FIG. 12A and FIG. 12B show depth perception and a reconstructed 3D environment when a semi-transparent object exists in a scene, according to a related art; and FIG. 13 shows depth perception and a reconstructed 3D environment when a reflective object exists in a scene, according to a related art.

DETAILED DESCRIPTION

Hereinafter, the operation principle of exemplary embodiments of the disclosure will be described in detail with reference to the accompanying drawings. The same or like elements illustrated on the drawings are designated by the same or like reference numerals as much as possible even though they are illustrated on different drawings. In the following description, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Various changes and modifications may be made to the disclosure, and the disclosure may have various embodiments, some of which will be described in detail with reference to the accompanying drawings. However, it should be appreciated that they are not intended to limit the disclosure to particular embodiments and the disclosure include various changes, equivalents, or alternatives falling within the sprit and scope of the disclosure.

As used in the disclosure, it will be understood that the singular expressions "a", "an", and "the" includes plural expressions unless the context clearly indicates otherwise. Therefore, for example, "a component surface" includes one or more component surfaces.

The terms including an ordinal number, such as expressions "a first" and "a second" may be used to describe

various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes a combination or any one of a plurality of relevant items enumerated.

The terms as used in an embodiment of the disclosure are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless separately defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
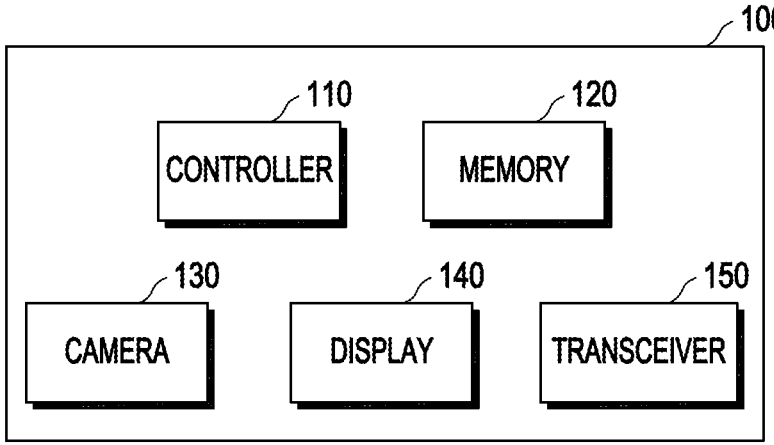
FIG. 1 illustrates a block diagram of an electronic device according to an embodiment of the disclosure.

FIG. 1 illustrates a block diagram of an electronic device according to an embodiment of the disclosure. An electronic device 100 may include a controller 110 and a memory 120. The electronic device 100 may be a smart phone, a personal digital assistance (PDA), a personal computer, an AR device, a VR device, or a combination thereof, but is not limited thereto. The electronic device 100 may be any device having computing capability capable of executing operations described in the disclosure.

The controller 110 may be implemented by at least one processor. The controller 110 may also be referred to as at least one processor. The controller 110 may be connected to other elements included in the electronic device 100 to control operations of the other elements. The controller 110 may control operations of the other elements to cause the electronic device 100 to perform operations. It may be interpreted that operations performed by the electronic device 100 are actually performed by the controller 110.

The memory 120 may be referred to as a "non-transitory computer-readable storage medium" to be distinguished from a medium for information transmission. The memory 120 may be implemented by at least one of a random-access memory (RAM), a read-only memory (ROM), a hard disk, a CD-ROM, and a solid-state drive (SSD), but is not necessarily limited thereto, and the memory 120 may be implemented via all types of storage media capable of storing and reading information. The memory 120 may store instructions executable by the controller 110. When the instructions are executed by the controller 110, the controller 110 (or the electronic device 100) may execute at least one of operations of the electronic device 100, which are described in the disclosure. The memory 120 may further store temporary or permanent data necessary for an operation of the controller 110.

According to an embodiment, the electronic device 100 may further include at least one of a camera 130, a display 140, and a transceiver 150.

The camera 130 may be a camera for capturing an image or a camera for acquiring depth information. A camera for acquiring depth information may acquire depth information of a scene by using a stereo scheme, a time of flight (ToF) scheme, or a structured pattern scheme. According to an embodiment, the camera 130 may be an RGB depth (RGB-D) camera capable of acquiring both an RGB image and depth information of a scene. The electronic device 100 may include multiple cameras. The multiple cameras may be multiple RGB-D cameras, or a combination of a camera for capturing one or more images and a camera for acquiring one or more pieces of depth information.

The display 140 may display an image based on a control of the controller 110. For example, the display 140 may display an image acquired using the camera 130. If the electronic device 100 is an AR device or a VR device, the display 140 may display a reconstructed 3D environment.

The transceiver 150 may include a circuit (i.e., a communication circuit) required for communication. The electronic device 100 may communicate with another device via the transceiver 150. The transceiver 150 may support at least one of various radio access technologies, such as long-term evolution (LTE), LTE-Advanced (LTE-A), code division multiple access (CDMA), orthogonal frequency division multiplexing (OFDM), and Bluetooth, but is not necessarily limited thereto. The transceiver 150 may provide a communication function for the electronic device 100 by using any known radio access technologies.

Figure 2:
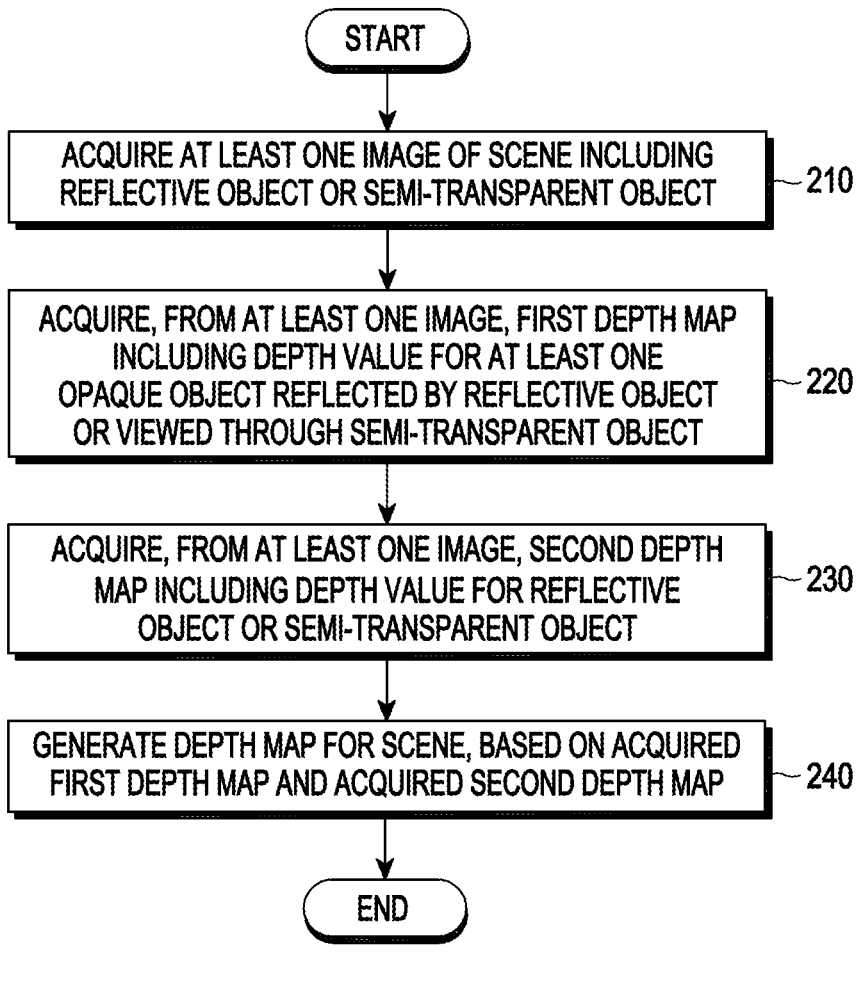

FIG. 2 illustrates a flowchart of a method for generating a depth map according to an embodiment of the disclosure. Operations described with reference to FIG. 2 may be executed by the electronic device 100.

The electronic device 100 may acquire at least one image of a scene including a reflective object or a semi-transparent object, in operation 210. The electronic device 100 may acquire the at least one image by using the camera 130 included in the electronic device 100 or may receive the at least one image from another device by using the transceiver 150. According to an embodiment, the at least one image may be a sequence of RGB image frames. According to an embodiment, the at least one image may be an RGB image of a scene, a depth image indicating depth information of the scene, or a combination thereof. According to an embodiment, the at least one image may include multiple images acquired at different locations.

The electronic device 100 may acquire, from the at least one image, a first depth map including a depth value for at least one opaque object reflected by the reflective object or viewed through the semi-transparent object in operation 220. The first depth map may include a depth map corresponding to a real position of the at least one opaque object reflected by the reflective object or viewed through the semi-transparent object. If the at least one image includes a depth image, the first depth map may be acquired from the depth image. If the at least one image does not include a depth image, the first depth map may be acquired from the at least one image by using a stereo scheme or using machine learning (e.g., a regression neural network (RNN)) trained to acquire a depth map from an image.

The electronic device 100 may acquire, from the at least one image, a second depth map including a depth value for the reflective object or the semi-transparent object in operation 230. If the at least one image includes a depth image, the second depth map may be acquired from the depth image. If the at least one image does not include a depth image, the second depth map may be acquired from the at least one image by using a stereo scheme or using machine learning (e.g., a regression neural network (RNN)) trained to acquire a depth map from an image. In order to acquire the second depth map, the electronic device 100 may identify the reflective object or the semi-transparent object and assign a corresponding depth value to the surface of the identified reflective object or semi-transparent object. According to an embodiment, the reflective object or the semi-transparent object may be identified by applying machine learning (e.g., a regression neural network (RNN)) to the at least one image.

The electronic device 100 may generate a depth map for the scene based on the acquired first depth map and the acquired second depth map in operation 240. The generated depth map may include a depth value for a first point on the reflective object or the semi-transparent object and a depth value for a second point on the opaque object which is reflected on the first point of the reflective object or viewed through the first point of the semi-transparent object. The depth map generated as above includes both the depth value for the semi-transparent object or the reflective object included in the scene and the depth value for the opaque object viewed through the semi-transparent object or viewed after being reflected on the reflective object. Based on this, the electronic device 100 may generate a depth map which effectively reflects a real configuration of the scene even when the scene includes the reflective object or the semi-transparent object.

According to an embodiment, the electronic device 100 may configure a 3D environment for the scene based on the depth map generated in operation 240. The electronic device 100 may transmit an image of the configured 3D environment to another device, or display the image of the configured 3D environment when the electronic device 100 includes the display 140.

Figure 3:
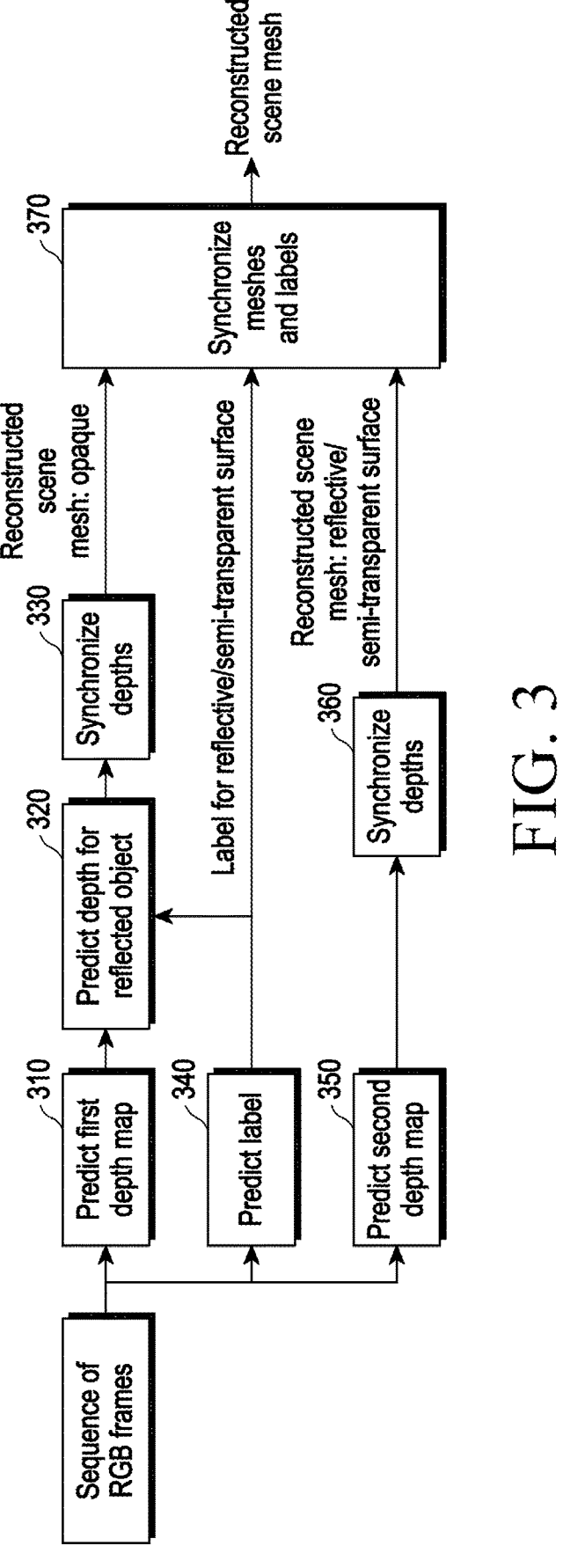

FIG. 3 illustrates a process for reconstructing a scene according to an embodiment of the disclosure. The process of FIG. 3 may be executed by the electronic device 100.

The electronic device 100 may predict a first depth map an object reflected by a reflective object or an object viewed through a semi-transparent object from a sequence of RGB frames for a scene, in operation 310. The sequence of RGB frames may be referred to as at least one image. According to an embodiment, the first depth map may be acquired not only from the sequence of RGB frames but also from a depth image or a combination of a depth image and an RGB image. The predicted first depth map may not include depth information for the object reflected by the reflective object or the object viewed through the semi-transparent object.

The electronic device 100 may perform label prediction on the scene, in operation 340. During this operation, each of objects included in the scene may be labeled. In an embodiment, a reflective object or a semi-transparent object among the objects included in the scene may be identified by labeling. By labeling, an object reflected by the reflective object or an object viewed through the semi-transparent object may be identified.

The electronic device 100 may predict or estimate a depth of the object reflected by the reflective object included in the scene, in operation 320. The depth of the object reflected by the reflective object may be predicted or estimated based on the reflective object and the reflected object which are identified by labeling. If the scene includes the semi-transparent object, the depth of the object viewed through the semi-transparent object may be predicted.

In operation 330, the electronic device 100 may synthesize, the first depth map predicted in operation 310 and the predicted or estimated depth of the object reflected by the reflective object or the object viewed through the semi-transparent object, which is predicted in operation 320. The first depth map derived by the depth synthesis may correspond to the first depth map described in operation 220.

The electronic device 100 may predict a second depth map for the reflective object or the semi-transparent object from the sequence of RGB frames, in operation 350. According to an embodiment, the first depth map may be acquired not only from the sequence of RGB frames but also from a depth image or a combination of a depth image and an RGB image. The predicted second depth map may not include depth information for the reflective object or the semi-transparent object. The electronic device 100 may predict or estimate a depth of the reflective object or the semi-transparent object.

The electronic device 100 may synthesize the second depth map predicted in operation 350 and the depth of the reflective object or the semi-transparent object, in operation 360. The second depth map derived by the depth synthesis may correspond to the second depth map described in operation 230.

The electronic device 100 may synthesize meshes from the first depth map, the second depth map, and the predicted labels, in operation 370. By the synthesis, a mesh for a reconstructed scene may be generated. A mesh for an opaque object including the object reflected by the reflective object or the object viewed through the semi-transparent object may be generated from the first depth map. A mesh for the reflective object or for the semi-transparent object may be generated from the second depth map. According to an embodiment, a depth map including the depth value for the reflective object or the semi-transparent object and the depth value for the object reflected by the reflective object or the object viewed through the semi-transparent object may be generated from the first depth map and the second depth map, and a mesh for the opaque object including the object reflected by the reflective object or the object viewed through the semi-transparent object and a mesh for the reflective object or the semi-transparent object may be generated from the generated depth map. The depth map generated here may correspond to the depth map generated in operation 240.

Figure 4:
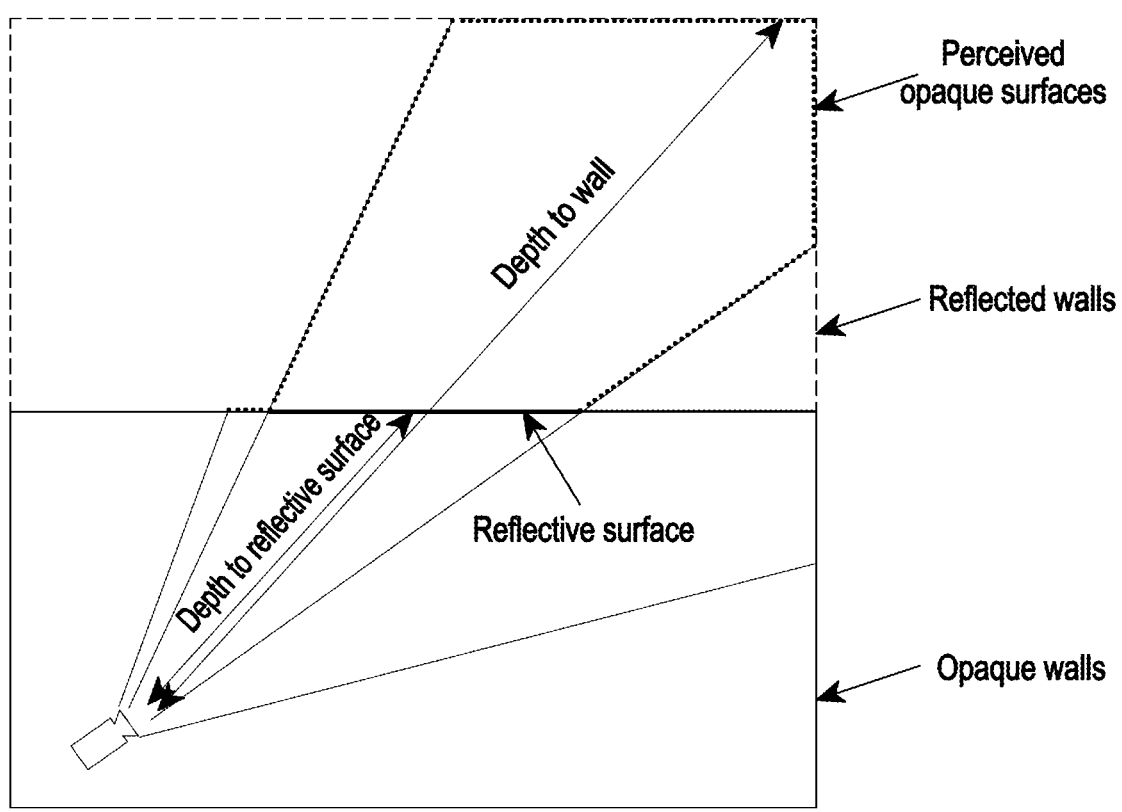

FIG. 4 illustrates a method for depth perception when a reflective surface exists, according to an embodiment of the disclosure. Here, the reflective surface refers to the surface of a reflective object.

The electronic device 100 may extract features from at least one image, and may determine distances to surfaces, based on the extracted features. To this end, in an embodiment, the electronic device 100 may use a feature extractor using machine learning. First of all, the electronic device 100 may predict depths to opaque surfaces included in at least one image, except for a reflective surface. The electronic device 100 may identify the reflective surface, based on the extracted features, and predict a depth to the reflective surface. According to an embodiment, the depth to the reflective surface may be predicted based on a depth to an opaque surface adjacent to the reflective surface. The electronic device 100 may predict the depths of the opaque surfaces perceived by reflection by the reflective surface. For example, referring to FIG. 4, opaque walls out of an image-capturing range of a camera may be reflected by a mirror so as to be perceived by the camera. The predicted depths with respect to the reflected opaque surfaces may correspond to the distances to the opaque surfaces perceived when the opaque surfaces are perceived to be behind the reflective surface. According to an embodiment, the first depth map acquired in operation 220 may have a depth value corresponding to a depth to the wall indicated in FIG. 4 with respect to a position of the reflective surface, and the second depth map acquired in operation 230 may have a depth value corresponding to the depth to the reflective surface indicated in FIG. 4 with respect to the position of the reflective surface. The depth map generated in operation 240 may have both the depth value corresponding to the depth to the wall and the depth value corresponding to the depth to the reflective surface with respect to the position of the reflective surface.

According to an embodiment, the depth of the opaque surface reflected by the reflective surface may be predicted by assuming that the opaque surface exists at a position symmetrical to a surface where the mirror is present from a position perceived by the camera.

Figure 5:
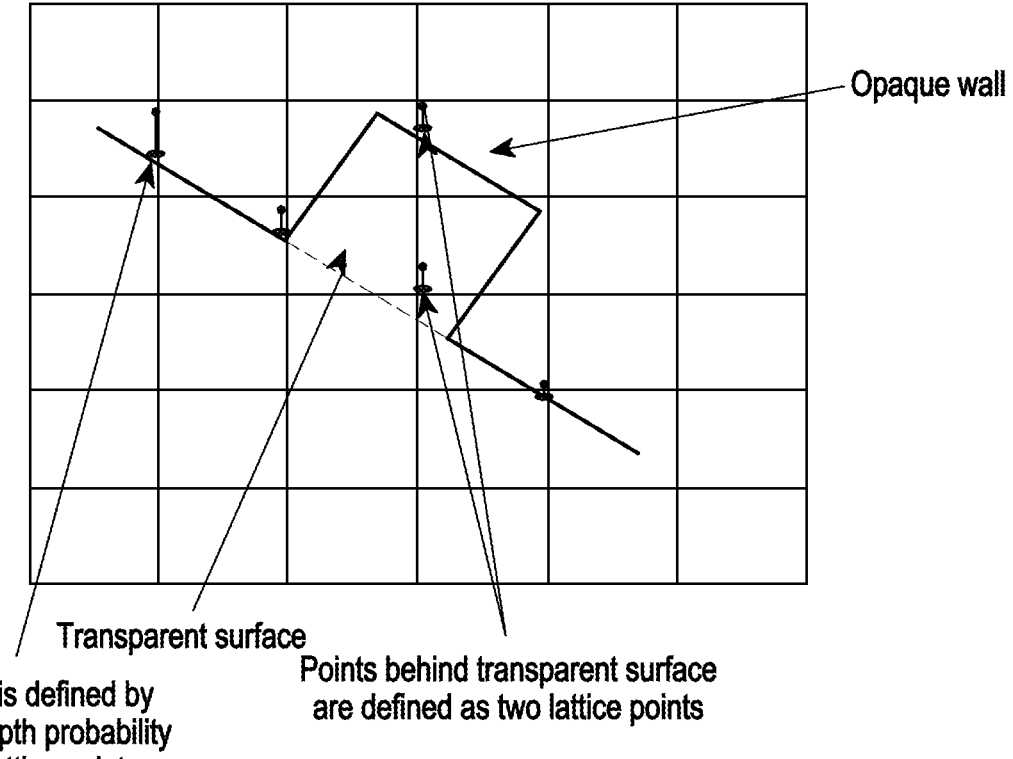

FIG. 5 illustrates a method for depth perception when a transparent surface exists, according to an embodiment of the disclosure. According to the embodiment of FIG. 5, depth values of objects may be expressed as difference values of depths of lattice points. For example, the depth values may be configured for designated points on a horizontal axis, which represent positions, and a depth value for one of the designated points on the horizontal axis may be expressed by a difference between the corresponding depth value and a depth value for a nearest lattice from among lattices where designated values on a vertical axis, which represent a position and a depth of the corresponding point, intersect. If both the surface of a semi-transparent object and the surface of an opaque object viewed through the semi-transparent (or transparent) object exist for a single position value, two depth values may exist for the single position value.

In the embodiment of FIG. 5, a scene may be expressed as a set of fronto-parallel planes. The fronto-parallel planes may be expressed by horizontal lines in FIG. 5. The fronto-parallel planes may have a value (i.e., a depth probability volume) indicating a probability of occupancy by an object at a specific point. For on-fronto-parallel($\rightarrow$non) planes, a depth shift volume may be used. Depth shift volume values may provide shift values for shifting of corresponding points of the fronto-parallel plane to the surface of a real object. Transparency/reflectivity volumes may assign transparency degrees and reflection coefficients to corresponding elements of the depth probability volumes. An expression scheme as shown in FIG. 5 may be suitable for complex scenes. If two real planes exist between two adjacent fronto-parallel planes, the scheme of FIG. 5 may not be able to provide a suitable expression, but such a problem may be solved by increasing the number of fronto-parallel planes.

A feature extractor using machine learning may be used to acquire a depth probability volume, a depth shift volume, and a transparency/reflectivity volume from at least one image.

According to an embodiment, the depth expression scheme using fronto-parallel planes as shown in FIG. 5 may be applicable to not only a case where a semi-transparent (or transparent) object exists in a scene, but also a case where a reflective object exists in a scene and a case where none of a semi-transparent object and a reflective object exists in a scene.

Figure 6:
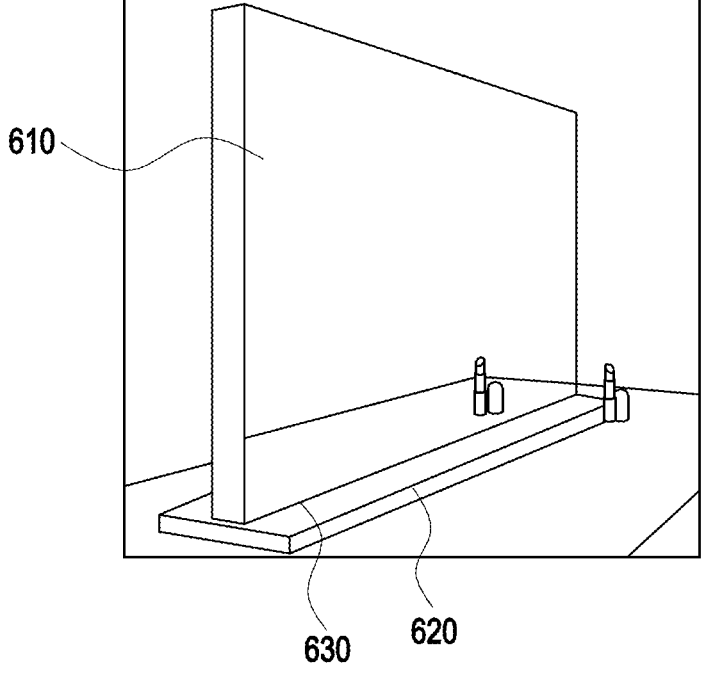

FIG. 6 illustrates a method for depth perception for a reflective surface according to an embodiment of the disclosure. If a reflective surface 610 (e.g., the front side of a mirror) is positioned perpendicular to a plane 620 on an opaque plane (e.g., a table), the electronic device 100 may identify an intersection line 630 where the reflective surface 610 and the plane 620 intersect. The electronic device 100 may determine a depth value for a position of the intersection line 630 and determine the depth value for the position of the intersection line 630 to be a depth value for the surface of a reflective object (i.e., the reflective surface 610). In this way, the depth value for the reflective object in the second depth map acquired in operation 230 may be determined.

Figure 7:
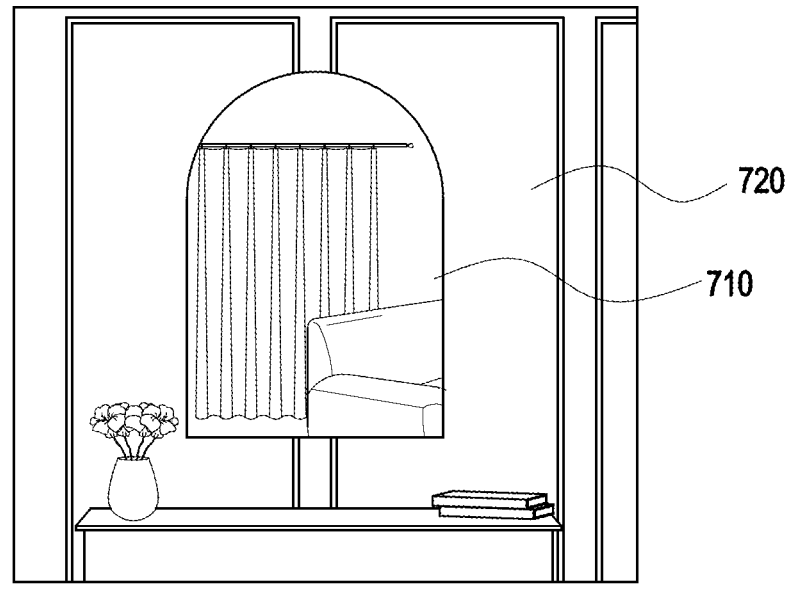

FIG. 7 illustrates a method for depth perception for a reflective surface according to an embodiment of the disclosure. If a reflective surface 710 (e.g., the front side of a mirror) is positioned parallel to an opaque plane 720 (e.g., a wall surface), the electronic device 100 may determine a depth value for the plane 720 and determine the depth value for the plane 720 to be a depth value for the reflective surface 710. When a reflective object including the reflective surface 710 is attached on the plane 720, a thickness of the reflective object, such as a mirror, is usually very thin, so that, if the depth value for the plane 720 is determined to be the depth value for the reflective surface 710, the depth value for the reflective surface 710 may be simply determined with a small error. In this way, the depth value for the reflective object in the second depth map acquired in operation 230 may be determined.

Figure 8A:
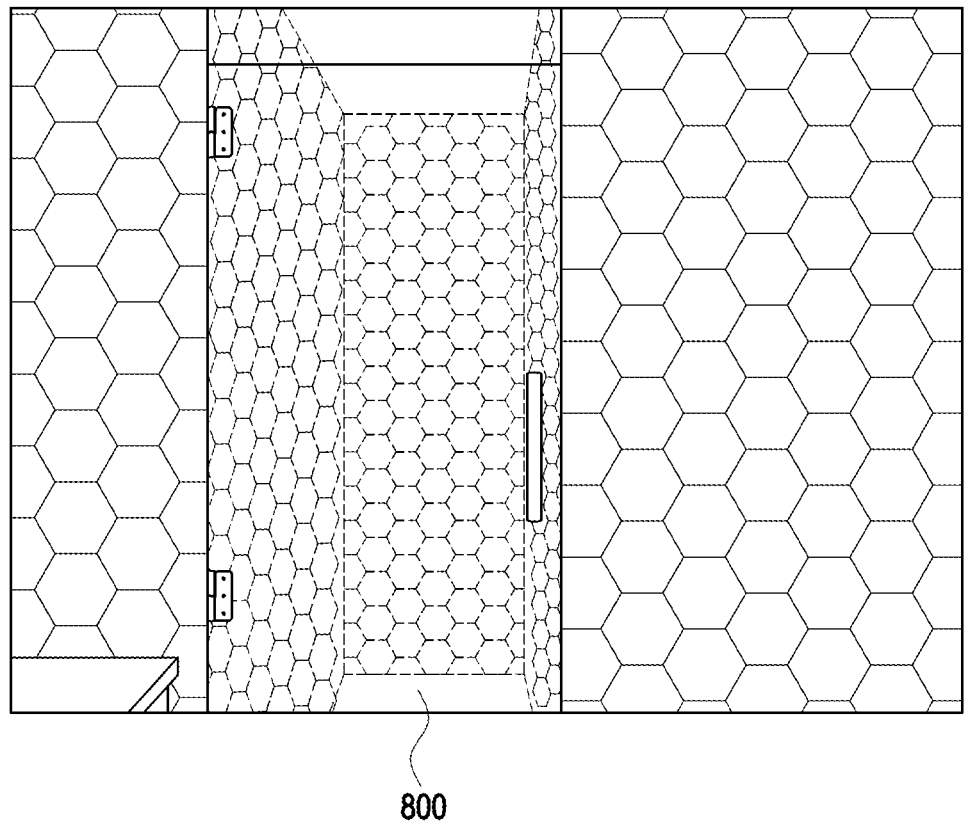
Figure 8B:
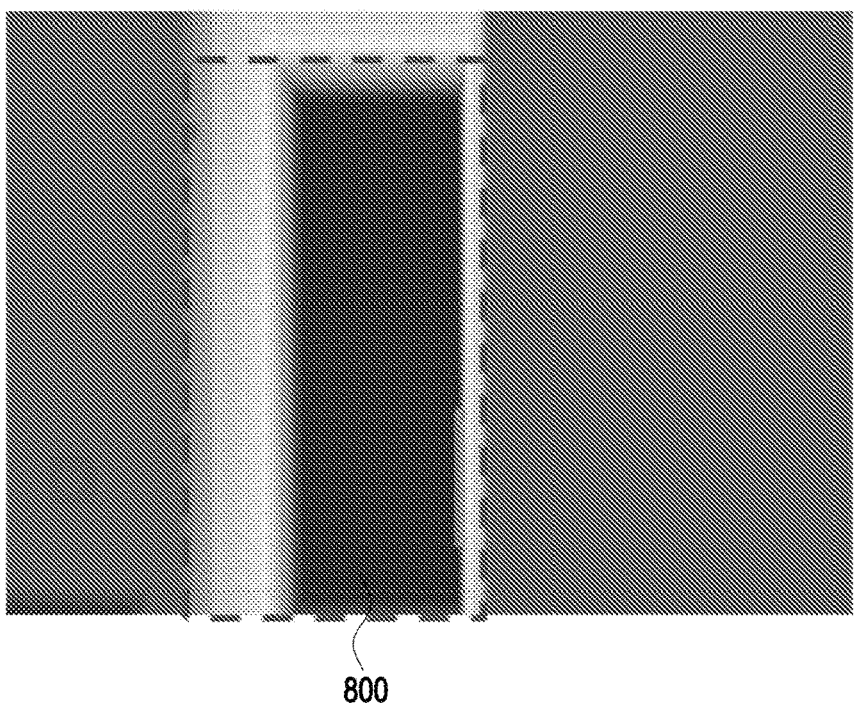
Figure 8C:
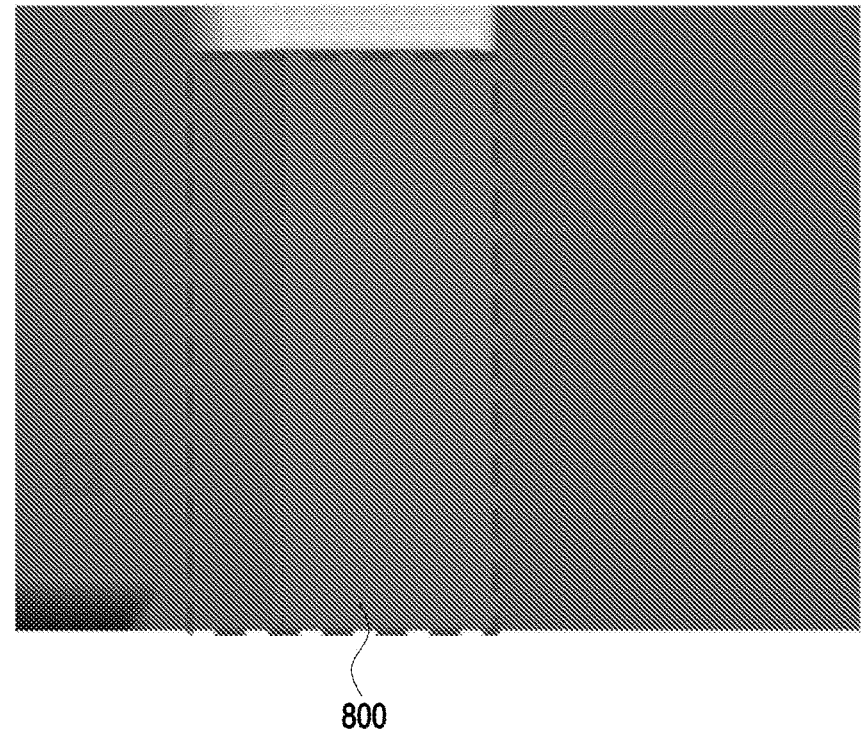

FIG. 8A, FIG. 8B, and FIG. 8C illustrate examples of depth maps when a semi-transparent object exists in a scene. FIG. 8A illustrates an image (e.g., an RGB image) of a scene. The scene may include a semi-transparent object 800, such as a semi-transparent door. FIG. 8B illustrates a first depth map for the scene. The first depth map may include a depth value for at least one surface or at least one object viewed through the semi-transparent object 800. FIG. 8C illustrates a second depth map for the scene. The second depth map may include the depth value for the semi-transparent object 800 or the surface of the semi-transparent object 800. According to an embodiment, the electronic device 100 may generate a depth map having multiple depth values for an area of the semi-transparent object from the first depth map and the second depth map. The generated depth map may correspond to the depth map generated in operation 240.

Figure 9A:
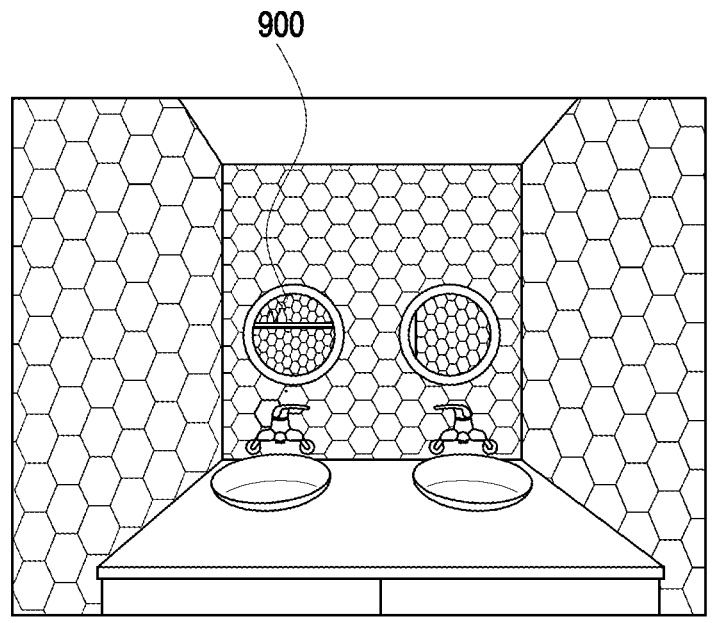
Figure 9B:
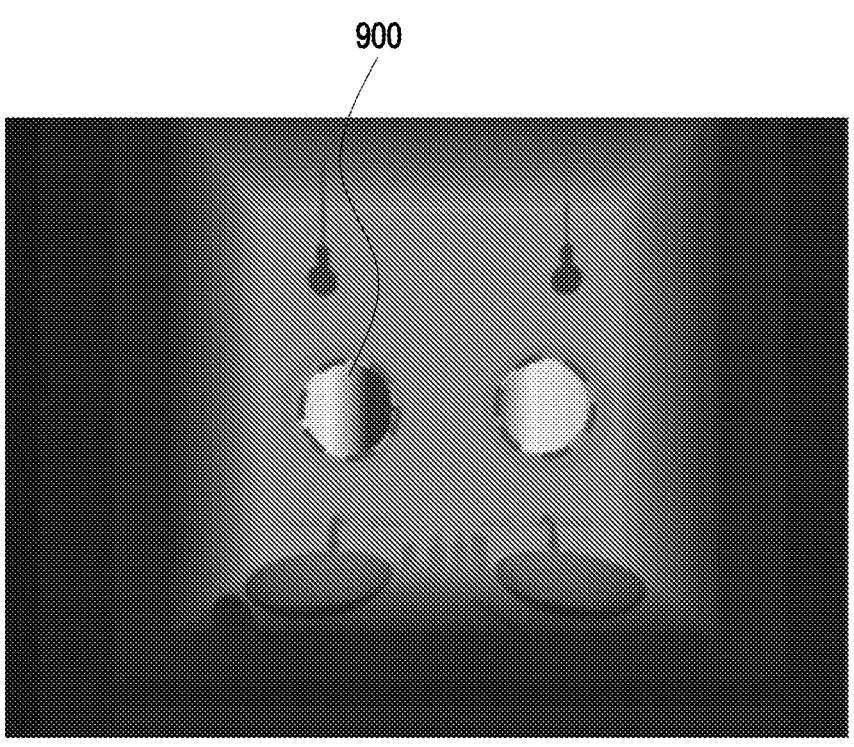
Figure 9C:
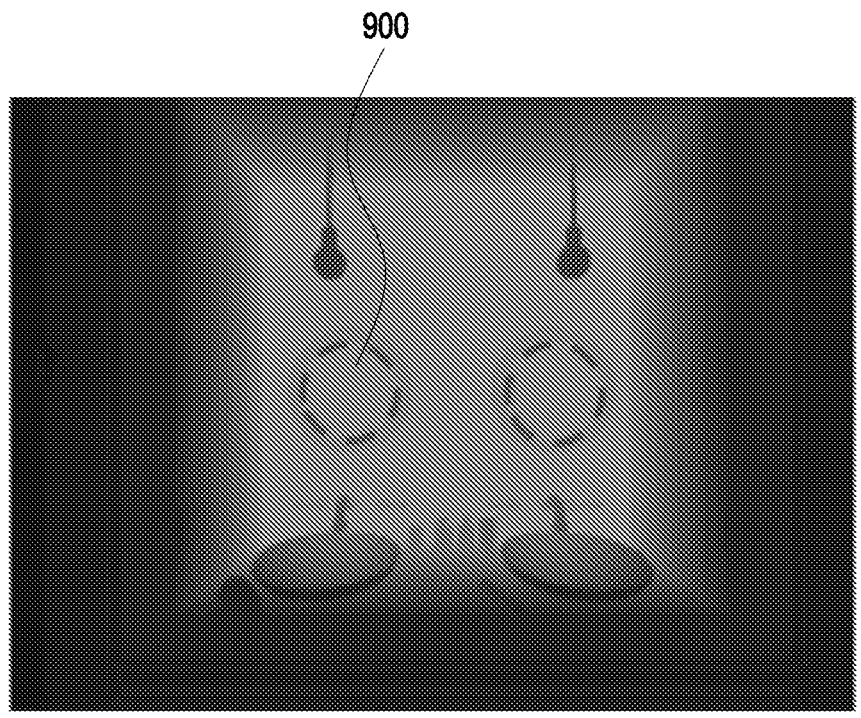

FIG. 9A, FIG. 9B, and FIG. 9C illustrate examples of depth maps when a reflective object exists in a scene. FIG. 9A illustrates an image (e.g., an RGB image) of a scene. The scene may include a reflective object 900, such as a mirror. FIG. 9B illustrates a first depth map for the scene. The first depth map may include a depth value for at least one surface or at least one object viewed after being reflected by the reflective object 900. FIG. 9C illustrates a second depth map for the scene. The second depth map may include the depth value for the reflective object 900 or the surface of the reflective object 900. According to an embodiment, the electronic device 100 may generate a depth map having multiple depth values for an area of the reflective object from the first depth map and the second depth map. The generated depth map may correspond to the depth map generated in operation 240.

Figure 10:
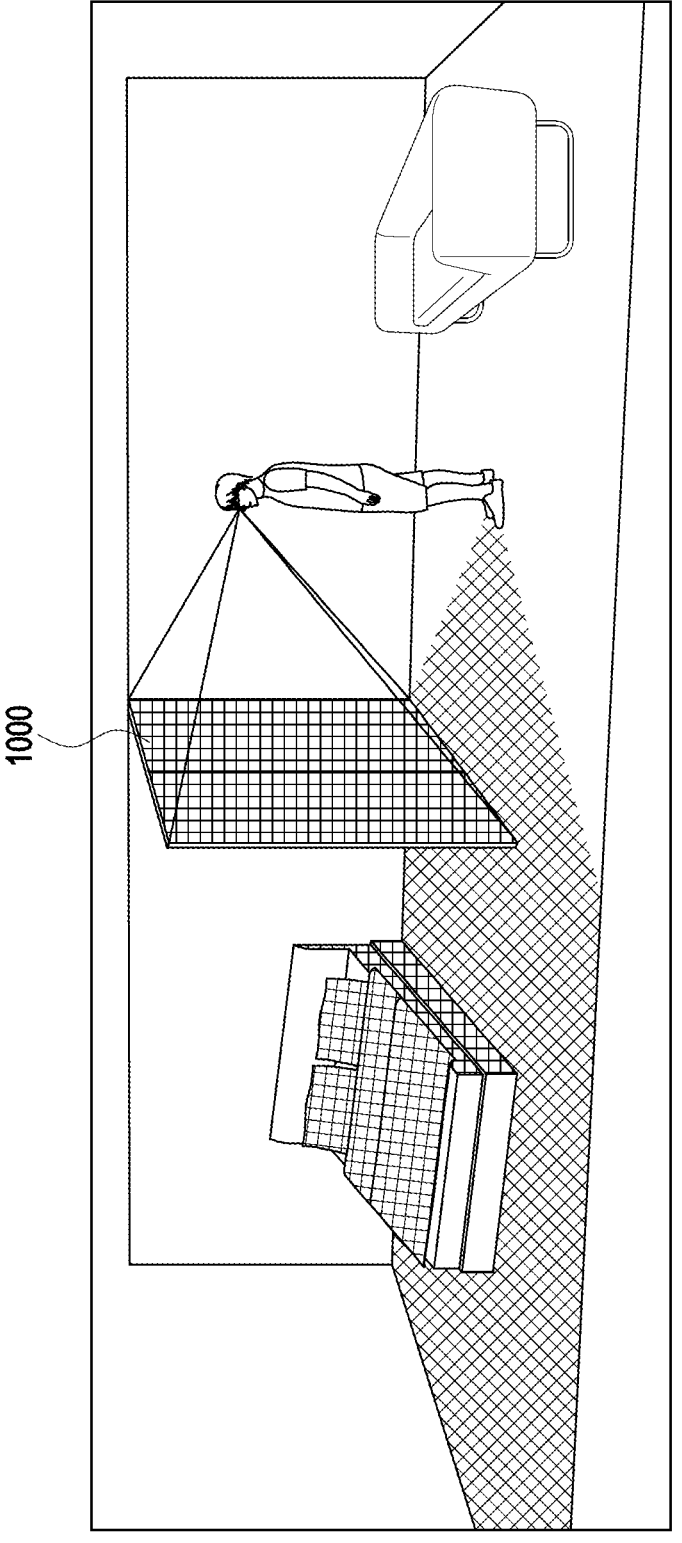

FIG. 10 illustrates an example of depth perception and a reconstructed 3D environment when a semi-transparent object exists in a scene, according to an embodiment of the disclosure. According to an embodiment of the disclosure, as shown in FIG. 10, if a semi-transparent object 1000 exists in a scene, a user may perceive, via the electronic device 100, a depth for the semi-transparent object and depths for surfaces or objects which are located behind the semi-transparent object 1000 to be viewed through the semi-transparent object 1000. A 3D environment reconstructed based on the depth perception method according to an embodiment of the disclosure may reconstruct and express (e.g., via a mesh) a semi-transparent object and surfaces or objects viewed through the semi-transparent object.

Figure 11:
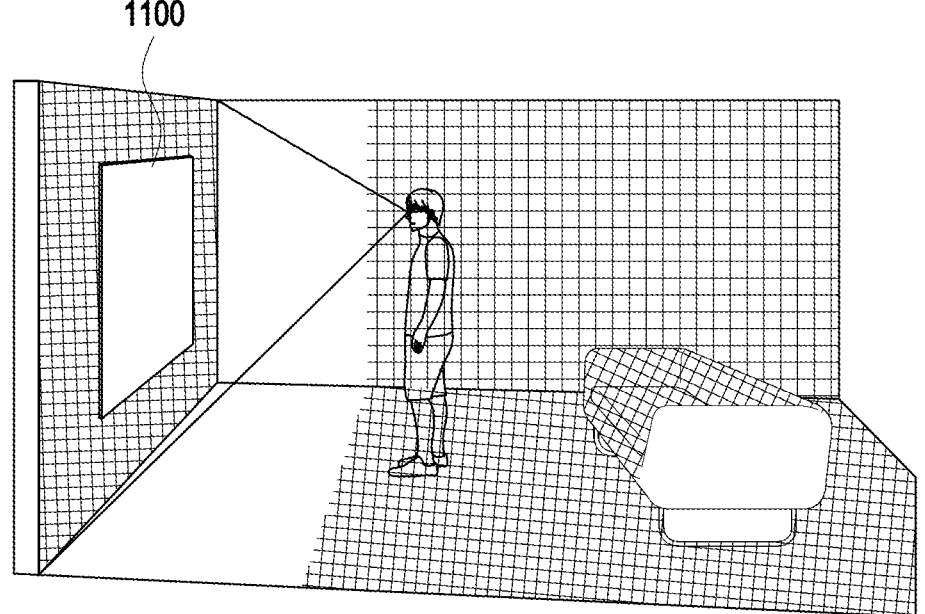
Figure 12A:
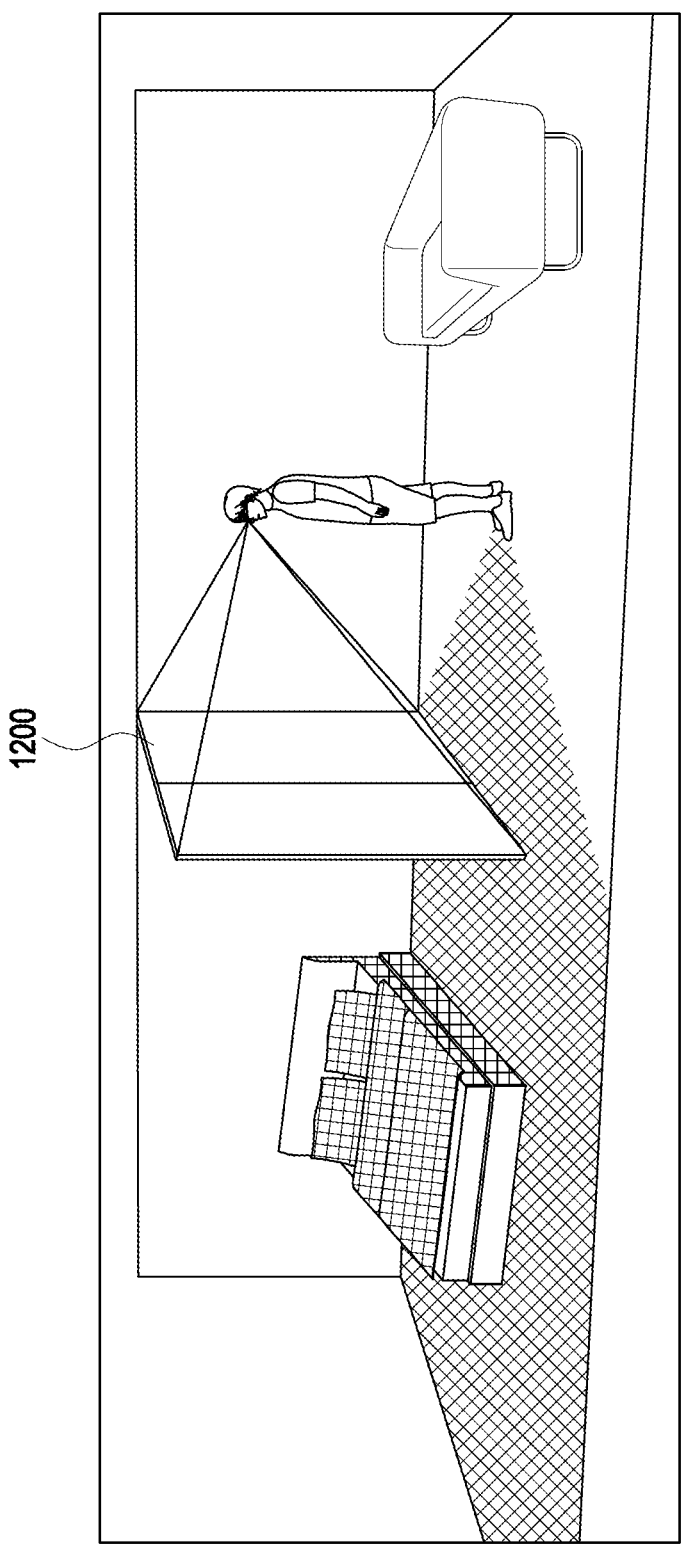
Figure 12B:
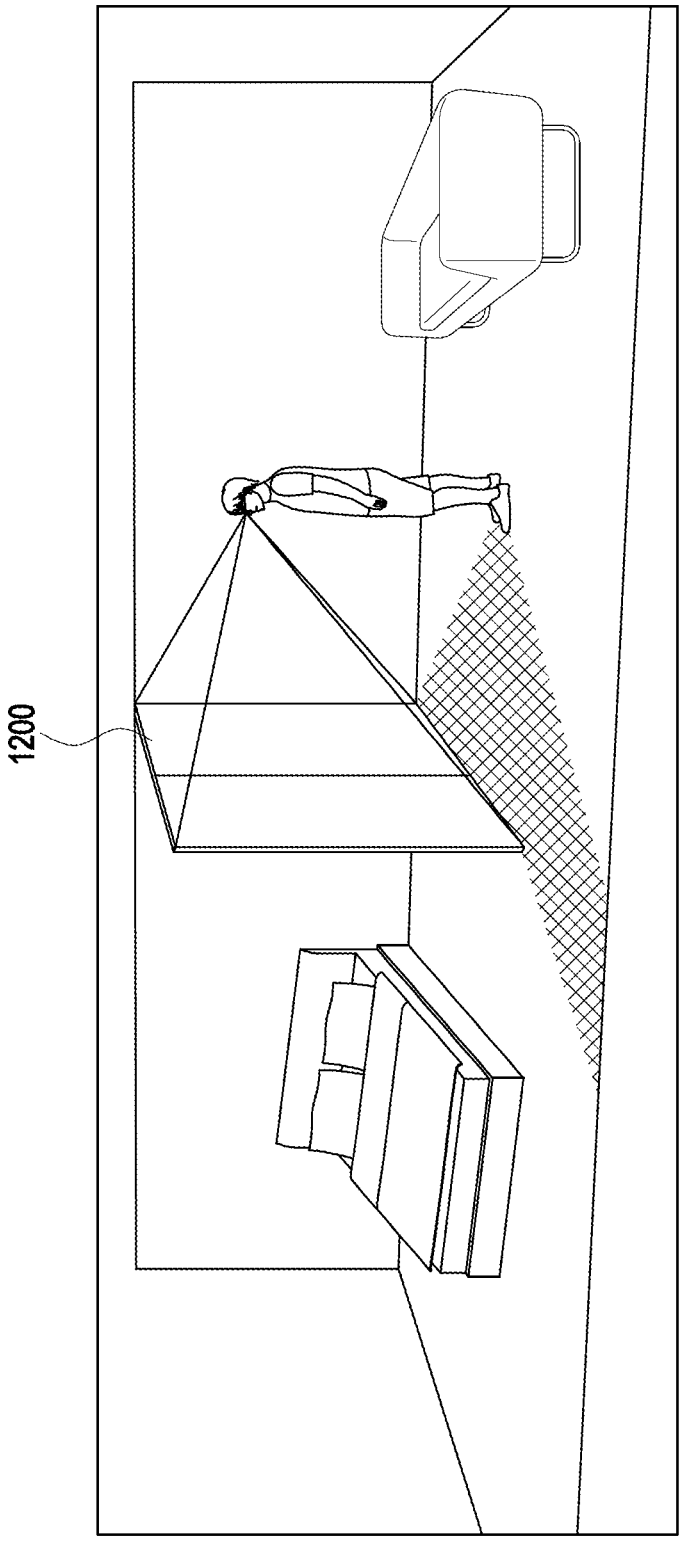
Figure 13:
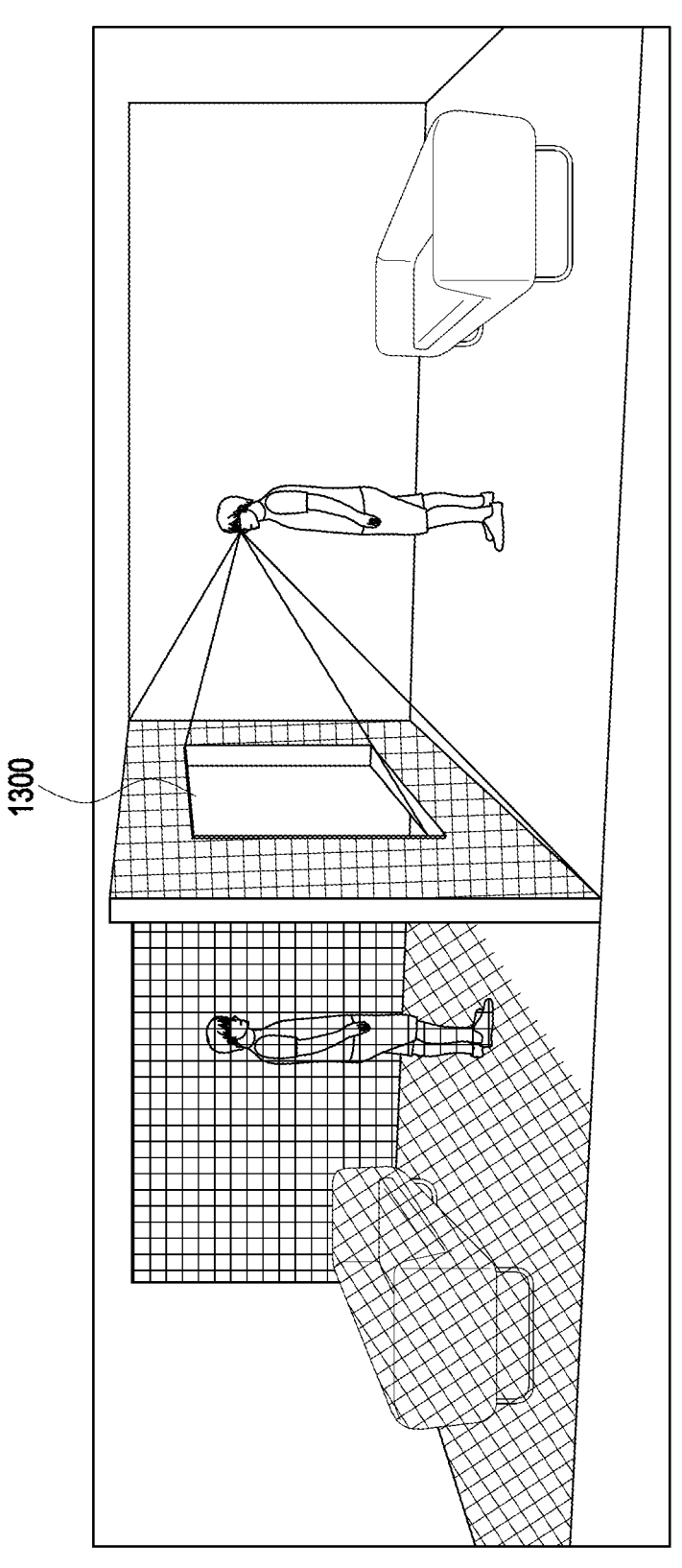

FIG. 11 illustrates an example of depth perception and a reconstructed 3D environment when a reflective object exists in a scene, according to an embodiment of the disclosure. According to an embodiment of the disclosure, as shown in FIG. 11, if a reflective object 1100 exists in a scene, a user may perceive, by the electronic device 100, a depth for the reflective object 1100 and depths for surfaces or objects viewed after being reflected by the reflective object 1100. A 3D environment reconstructed based on the depth perception method according to an embodiment of the disclosure may reconstruct and express (e.g., via a mesh) a reflective object and surfaces or objects reflected by the reflective object.

According to a method for 3D environment reconstruction and depth perception according to an embodiment of the disclosure, under an environment including a semi-transparent object or a reflective object, efficiency of space recognition and moving path configuration of devices, such as a cleaning robot, may be improved. A possibility of collision of a flying device, such as a drone, with a semi-transparent object or a reflective object may be reduced. A user may reconstruct a real environment into a 3D environment more easily by using a camera. In an AR environment, a user may interact more easily with a semi-transparent object or a reflective object. In an AR environment, both a reflective object and an object viewed after being reflected on the reflective object may be effectively expressed.

According to a method for 3D environment reconstruction and depth perception, efficiency of space recognition and moving path configuration of devices may be improved. In addition, a user may reconstruct a real environment into a 3D environment more easily by using a camera. In an AR environment, a reflective object and an object viewed after being reflected on the reflective object may be effectively expressed.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method for generating a depth map, the method comprising:

acquiring at least one image of a scene including a reflective object or a semi-transparent object;

acquiring, from the at least one image, a first depth map including a depth value for at least one opaque object which is reflected by the reflective object or viewed through the semi-transparent object;

acquiring, from the at least one image, a second depth map including a depth value for the reflective object or the semi-transparent object; and generating a depth map for the scene based on the acquired first depth map and the acquired second depth map, wherein the generated depth map includes the depth value for the reflective object or the semi-transparent object and the depth value for the at least one opaque object which is reflected by the reflective object or viewed through the semi-transparent object.

2. The method of claim 1, wherein the acquiring of the second depth map comprises:

based on the scene including the reflective object and the reflective object being placed perpendicularly on an opaque surface, identifying an intersection line between the opaque surface and a surface of the reflective object;

determining a depth value of the intersection line; and determining the depth value of the intersection line to be a depth value for the surface of the reflective object.

3. The method of claim 1, wherein the acquiring of the second depth map comprises:

based on the scene including the reflective object and the reflective object being placed in parallel on an opaque surface, determining a depth value of the opaque surface; and determining the depth value of the opaque surface to be the depth value for a surface of the reflective object.

4. The method of claim 1, wherein the acquiring of the first depth map comprises:

generating a third depth map including no depth value for the at least one opaque object which is reflected by the reflective object or viewed through the semi-transparent object;

estimating the depth value for the at least one opaque object which is reflected by the reflective object or viewed through the semi-transparent object; and synthesizing the estimated depth value for the at least one opaque object with the third depth map.

5. The method of claim 1, wherein the acquiring of the first depth map comprises:

predicting a depth map for the at least one opaque object from a sequence of RGB frames for the scene;

predicting the depth value for the at least one opaque object based on the reflective object and the at least one opaque object; and synthesizing the predicted depth value for the at least one opaque object with the predicted depth map.

6. The method of claim 1, wherein the acquiring of the second depth map comprises:

generating a fourth depth map including no depth value for the reflective object or the semi-transparent object;

estimating the depth value for the reflective object or the semi-transparent object; and synthesizing the estimated depth value for the reflective object or the semi-transparent object with the fourth depth map.

7. The method of claim 1, further comprising reconstructing a three-dimensional (3D) environment for the scene based on the generated depth map.

8. The method of claim 1, wherein the at least one image includes an RGB-D image.

9. An electronic device for generating a depth map, the electronic device comprising:

a memory configured to store instructions; and a controller coupled to the memory and configured to execute the instructions to:

acquire at least one image of a scene including a reflective object or a semi-transparent object;

acquire, from the at least one image, a first depth map including a depth value for at least one opaque object which is reflected by the reflective object or viewed through the semi-transparent object;

acquire, from the at least one image, a second depth map including a depth value for the reflective object or the semi-transparent object; and generate a depth map for the scene based on the acquired first depth map and the acquired second depth map, wherein the generated depth map includes the depth value for the reflective object or the semi-transparent object and the depth value for the at least one opaque object which is reflected by the reflective object or viewed through the semi-transparent object.

10. The electronic device of claim 9, wherein the controller is further configured to execute the instructions to:

based on the scene including the reflective object and the reflective object being placed perpendicularly on an opaque surface, identify an intersection line between the opaque surface and a surface of the reflective object;

determine a depth value of the intersection line; and determine the depth value of the intersection line to be a depth value for the surface of the reflective object.

11. The electronic device of claim 9, wherein the controller is further configured to execute the instructions to:

based on the scene including the reflective object and the reflective object being placed in parallel on an opaque surface, determine a depth value of the opaque surface; and determine the depth value of the opaque surface to be the depth value for a surface of the reflective object.

12. The electronic device of claim 9, wherein the controller is further configured to execute the instructions to:

generate a third depth map including no depth value for the at least one opaque object which is reflected by the reflective object or viewed through the semi-transparent object;

estimate the depth value for the at least one opaque object which is reflected by the reflective object or viewed through the semi-transparent object; and synthesize the estimated depth value for the at least one opaque object with the third depth map.

13. The electronic device of claim 9, wherein the controller is further configured to execute the instructions to:

predict a depth map for the at least one opaque object from a sequence of RGB frames for the scene;

predict the depth value for the at least one opaque object based on the reflective object and the at least one opaque object; and synthesize the predicted depth value for the at least one opaque object with the predicted depth map.

14. The electronic device of claim 9, wherein the controller is further configured to execute the instructions to:

generate a fourth depth map including no depth value for the reflective object or the semi-transparent object;

estimate the depth value for the reflective object or the semi-transparent object; and synthesize the estimated depth value for the reflective object or the semi-transparent object with the fourth depth map.

15. The electronic device of claim 9, wherein the controller is further configured to execute the instructions to reconstruct a three-dimensional (3D) environment for the scene based on the generated depth map.

16. The electronic device of claim 9, wherein the at least one image includes an RGB-D image.

17. A non-transitory computer-readable storage medium for storing instructions for generating a depth map, wherein the instructions, when executed by a controller of an electronic device, cause the electronic device to operate a method for generating a depth map, the method comprising:

acquiring at least one image of a scene including a reflective object or a semi-transparent object;

acquiring, from the at least one image, a first depth map including a depth value for at least one opaque object which is reflected by the reflective object or viewed through the semi-transparent object;

acquiring, from the at least one image, a second depth map including a depth value for the reflective object or the semi-transparent object; and generating a depth map for the scene based on the acquired first depth map and the acquired second depth map, wherein the generated depth map includes the depth value for the reflective object or the semi-transparent object and the depth value for the at least one opaque object which is reflected by the reflective object or viewed through the semi-transparent object.

18. The non-transitory computer-readable storage medium of claim 17, wherein the acquiring of the second depth map comprises:

based on the scene including the reflective object and the reflective object being placed perpendicularly on an opaque surface, identifying an intersection line between the opaque surface and a surface of the reflective object;

determining a depth value of the intersection line; and determining the depth value of the intersection line to be a depth value for the surface of the reflective object.

19. The non-transitory computer-readable storage medium of claim 17, wherein the acquiring of the second depth map comprises:

based on the scene including the reflective object and the reflective object being placed in parallel on an opaque surface, determining a depth value of the opaque surface; and determining the depth value of the opaque surface to be the depth value for a surface of the reflective object.

20. The non-transitory computer-readable storage medium of claim 17, wherein the acquiring of the first depth map comprises:

generating a third depth map including no depth value for the at least one opaque object which is reflected by the reflective object or viewed through the semi-transparent object;

estimating the depth value for the at least one opaque object which is reflected by the reflective object or viewed through the semi-transparent object; and synthesizing the estimated depth value for the at least one opaque object with the third depth map.

\* \* \* \* \*